United States Patent
Lin et al.

(10) Patent No.: US 12,538,036 B2
(45) Date of Patent: Jan. 27, 2026

(54) SYSTEMS AND METHODS FOR REDUCING STRAYLIGHT REFLECTIONS

(71) Applicant: GM GLOBAL TECHNOLOGY OPERATIONS LLC, Detroit, MI (US)

(72) Inventors: Chao-Hung Lin, Canton, MI (US); Sai Vishnu Aluru, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 18/461,199

(22) Filed: Sep. 5, 2023

(65) Prior Publication Data

US 2025/0080861 A1   Mar. 6, 2025

(51) Int. Cl.
*H04N 23/75* (2023.01)
*G06T 7/00* (2017.01)

(52) U.S. Cl.
CPC ............ *H04N 23/75* (2023.01); *G06T 7/0002* (2013.01); *G06T 2207/30168* (2013.01)

(58) Field of Classification Search
CPC ....... G06T 2207/30; G06T 2207/30168; G06T 2207/30248; G06T 2207/30252; G06T 2207/30256; G06T 2207/30261; G06T 2207/30264; G06T 7/0002; H04N 23/70; H04N 23/71; H04N 23/75; H04N 23/76; H04N 23/80; H04N 23/82
See application file for complete search history.

(56) References Cited

U.S. PATENT DOCUMENTS

| | | | |
|---|---|---|---|
| 7,729,607 B2* | 6/2010 | Karim | G03B 15/03 396/176 |
| 11,425,314 B2* | 8/2022 | Raaijmakers | G08G 1/166 |
| 11,874,539 B1* | 1/2024 | Philipp | H04N 23/55 |
| 12,088,929 B2* | 9/2024 | Hirasawa | H04N 23/71 |
| 12,243,285 B2* | 3/2025 | Schönlieb-Stalzer et al. | G06V 10/895 |
| 2008/0129541 A1* | 6/2008 | Lu | G06V 20/56 340/905 |

(Continued)

FOREIGN PATENT DOCUMENTS

DE   102018216983 B3   11/2019

OTHER PUBLICATIONS

Office Action dated Jul. 4, 2024 from German Patent Office for German Patent No. 10 2023 130 373.2; 5pgs.

*Primary Examiner* — Georgia Y Epps (57) ABSTRACT

A system includes a camera module located within a vehicle, a linear polarizer module positioned in a field of view of the camera module, and a control module in communication with the camera module and the linear polarizer module. The camera module is configured to acquire image frames depicting scenery external to the vehicle and transmit the image frames to a perception pipeline of the vehicle. The control module is configured to receive an image frame from the camera module, analyze the image frame to identify whether a reflection is present, and in response to identifying the reflection in the image frame, selectively activate the linear polarizer module to remove the reflection from a subsequent image frame captured by the camera module. Other example systems and methods for removing reflections from image frames captured by camera modules located within vehicles are also disclosed.

20 Claims, 5 Drawing Sheets

(56) References Cited

U.S. PATENT DOCUMENTS

| | | | |
|---|---|---|---|
| 2013/0058528 A1* | 3/2013 | Liu | G06V 20/588 |
| | | | 382/103 |
| 2019/0273856 A1 | 9/2019 | Hirasawa et al. | |
| 2020/0104566 A1* | 4/2020 | Yamada | H04N 23/73 |
| 2022/0006936 A1* | 1/2022 | Raaijmakers | G08G 1/166 |
| 2023/0023670 A1* | 1/2023 | Stoschek | G06V 10/764 |
| 2023/0143446 A1* | 5/2023 | Schönlieb-Stalzer | |
| | | | G06V 10/147 |
| | | | 345/426 |
| 2024/0019720 A1* | 1/2024 | Philipp | H04N 23/55 |
| 2025/0080861 A1* | 3/2025 | Lin | G06T 7/0002 |

\* cited by examiner

SYSTEMS AND METHODS FOR REDUCING STRAYLIGHT REFLECTIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for reducing straylight reflections, and more particularly to reducing straylight reflections from vehicle windshields by selectively activating linear polarizer modules.

A vehicle may include a driver assistance system that relies on cameras and sensors for controlling applications, such as autonomy applications of the vehicle. For example, the driver assistance system may receive images captured by a camera and other data from a perception pipeline, and then control autonomy applications of the vehicle based on the data received from the perception pipeline.

SUMMARY

A system a vehicle includes a camera module located within the vehicle, a linear polarizer module positioned in a field of view of the camera module, and a control module in communication with the camera module and the linear polarizer module. The camera module is configured to acquire image frames depicting scenery external to the vehicle and transmit the image frames to a perception pipeline of the vehicle. The control module is configured to receive an image frame from the camera module, analyze the image frame to identify whether a reflection is present, and in response to identifying the reflection in the image frame, selectively activate the linear polarizer module to remove the reflection from a subsequent image frame captured by the camera module.

In other features, the control module is configured to scan the image frame for one or more static pixels to identify whether the reflection is present.

In other features, the control module is configured to verify the one or more static pixels are associated with the reflection based on a bit slice analysis of the image frame.

In other features, the control module is configured to modify a contrast value and a luma value of the camera module to increase a quality of the subsequent image frame captured by the camera module via the activated linear polarizer module.

In other features, the control module is configured to obtain a contrast value and a luma value of the received image frame with the reflection and modify the contrast value and the luma value of the camera module based on the contrast value and the luma value of the received image frame.

In other features, the control module is configured to deactivate the linear polarizer module.

In other features, the control module is configured to deactivate the linear polarizer module in response to a defined number of consecutive image frames captured by the camera module after activating the linear polarizer module.

In other features, the defined number of consecutive image frames is sixty consecutive image frames.

In other features, the system further includes a windshield positioned adjacent to the camera module. The windshield includes a surface and a coating applied to the surface.

In other features, the camera module is configured to acquire the image frames depicting scenery external to the vehicle via the windshield.

In other features, the coating is configured to reduce a loss of intensity of the image frames due to the reflection.

A method of removing reflections from image frames captured by a camera module located within a vehicle, includes receiving an image frame from the camera module, analyzing the image frame to identify whether a reflection is present, in response to identifying the reflection in the image frame, selectively activating a linear polarizer module positioned in a field of view of the camera module to remove the reflection from a subsequent image frame captured by the camera module, and transmitting the subsequent image frame to a perception pipeline of the vehicle for use in control of the vehicle.

In other features, analyzing the image frame includes scanning the image frame for one or more static pixels to identify whether the reflection is present.

In other features, analyzing the image frame includes verifying the one or more static pixels are associated with the reflection based on a bit slice analysis of the image frame.

In other features, the method further includes modifying a contrast value and a luma value of the camera module to increase a quality of the subsequent image frame captured by the camera module via the activated linear polarizer module.

In other features, the method further includes obtaining a contrast value and a luma value of the image frame with the reflection.

In other features, modifying the contrast value and the luma value of the camera module includes modifying the contrast value and the luma value of the camera module based on the obtained contrast value and luma value.

In other features, the method further includes deactivating the linear polarizer module.

In other features, deactivating the linear polarizer module includes deactivating the linear polarizer module in response to a defined number of consecutive image frames captured by the camera module after activating the linear polarizer module.

In other features, the defined number of consecutive image frames is sixty consecutive image frames.

A system a vehicle includes a camera module located within the vehicle, a linear polarizer module positioned in a field of view of the camera module, and a control module in communication with the camera module and the linear polarizer module. The camera module is configured to acquire image frames depicting scenery external to the vehicle and transmit the image frames to a perception pipeline of the vehicle. The control module is configured to receive a first image frame from the camera module, selectively activate the linear polarizer module and receive a second image frame from the camera module, analyze the first image frame and the second image frame to identify whether a reflection is present in the first image frame, and in response to identifying the reflection, remove the reflection from the first image frame.

In other features, the control module is configured to remove the reflection from the first image frame by modifying pixels in the first image frame.

In other features, the system further includes a windshield positioned adjacent to the camera module. The windshield includes a surface and a coating applied to the surface.

In other features, the camera module is configured to acquire the image frames depicting scenery external to the vehicle via the windshield.

In other features, the coating is configured to reduce a loss of intensity of the image frames due to the reflection.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles often rely on images captured by a camera for controlling various driver assistance applications, such as autonomy applications. In such cases, the camera may be positioned within a vehicle (e.g., behind the windshield) to capture images that depict scenery external to the vehicle. Sometimes, straylight reflections are introduced into the captured images due to, for example, the windshield. The captured images with reflections are then passed to a perception pipeline and processed for use in the driver assistance applications. The driver assistance applications may interpret the reflections as being an object on or alongside the road and/or may miss an actual object on or alongside the road because the object is hidden behind the reflections. This may lead to undesirable control associated with the driver assistance applications and/or vehicle accidents. In some conventional systems, light baffles may be used to block straylight reflections. However, such light baffles may block the driver's sight when driving.

The systems and methods according to the present disclosure enable the filtering of straylight reflections from image frames through the selective control of a linear polarizer module in the optical path of a camera module. For example, the systems and methods herein may utilize a control module that selectively activates the linear polarizer module when desired and removes or filters out a reflection (e.g., caused by a vehicle windshield) from image frames captured by the camera module. For instance, in-cabin straylight from an instrument panel surface and/or another vehicle surface may be reflected by the windshield and directed towards the camera module. In most vehicles, the angle of incidence of the straylight reflected by the windshield is greater than 55 degrees, and therefore is polarization dependent. Through the selective activation of the linear polarizer module, the reflection may be filtered from image frames captured by the camera module. This filtering function can be utilized to reduce the in-cabin ghost reflections, to provide ghost reflections information in the depicted scenery, and/or to reduce the straylight intensity from objects (e.g., the road) external to the vehicle to enhance the visibility of the objects of interest, as further explained herein.

Figure 1:
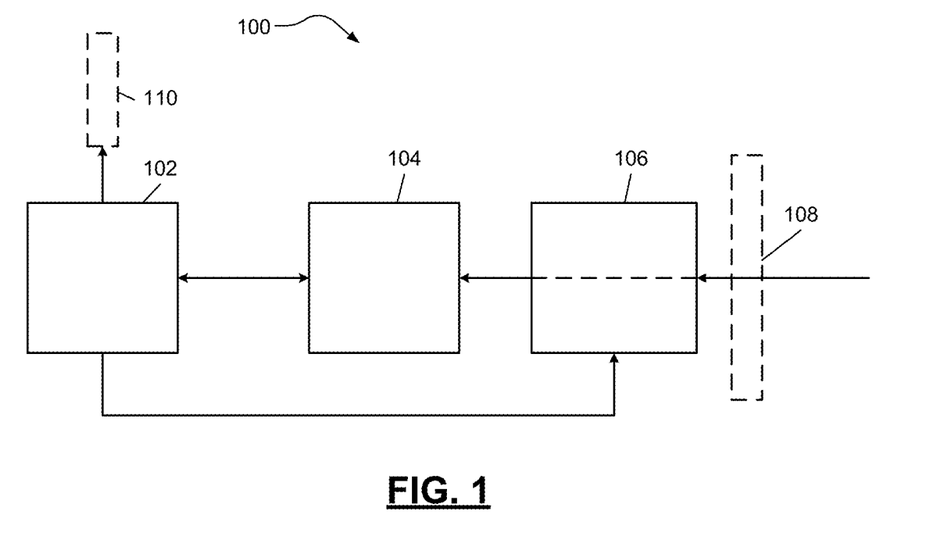
FIG. 1 is a functional block diagram of an example system for removing reflections from image frames captured by a camera module located within a vehicle, according to the present disclosure.

Referring now to FIG. 1, a block diagram of an example system 100 is presented for removing reflections from image frames captured by a camera module located within a vehicle. The system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the system 100 may be applicable to an autonomous vehicle, a semi-autonomous vehicle, or a non-autonomous vehicle. While the system 100 of FIG. 1 and/or other systems and methods herein are described with respect removing reflections from image frames captured by vehicle camera modules, it should be appreciated that any one the systems and/or methods herein may be applicable for non-vehicle implementations if desired.

As shown in FIG. 1, the system 100 generally includes a control module 102, a camera module 104, and a linear polarizer module 106. In such examples, the camera module 104 is located within a vehicle for acquiring image frames depicting scenery external to the vehicle via a windshield 108. Then, the camera module 104 may transmit the image frames to a perception pipeline 110 of the vehicle for use in controlling various driver assistance applications, such as autonomy applications.

The camera module 104 of FIG. 1 may be any suitable type of camera for capturing image frames. For example, the camera module 104 may be a conventional front camera module positioned near a rearview mirror in the vehicle. In such examples, the front camera module may capture image frames depicting scenery generally in front of the vehicle. In other examples, the camera module 104 may be positioned in another suitable location in the vehicle for capturing image frames depicting scenery external to the vehicle via the windshield 108 and/or another viewing glass (e.g., side windows, etc.) in the vehicle.

The linear polarizer module 106 may be any suitable linear polarizer capable of reducing or filtering reflections. In such examples, the linear polarizer module 106 is generally positioned in a field of view (e.g., an optical path) of the camera module 104 and functions in a similar manner as a conventional linear polarizer. For example, when the linear polarizer module 106 is positioned in the field of view of the camera module 104 and activated, reflections that would otherwise appear in image frames captured by the camera module 104 may be filtered or removed.

In the example of FIG. 1, the linear polarizer module 106 is positioned external to the camera module 104 and in the field of view of the camera module 104. While the linear polarizer module 106 is shown external to the camera module 104 in FIG. 1, it should be appreciated that the linear polarizer module 106 may be positioned in other suitable locations. For example, the linear polarizer module 106 may be positioned within (e.g., installed in) the camera module 104 and in the field of view of the camera module 104. For instance, the linear polarizer module 106 may be positioned between a lens and a housing of the camera module 104. In other examples, the linear polarizer module 106 may be a part of a lens assembly (e.g., in the lens, etc.). In still other examples, the linear polarizer module 106 may be a part of a sensor package (e.g., positioned on an image sensor, etc.) in the camera module 104.

The control module 102 is in communication with the camera module 104 and the linear polarizer module 106. For example, in various embodiments, the control module 102 receives one or more image frames from the camera module 104. Such image frames depict scenery generally in front of the vehicle due to the position of the camera module 104. In some examples, straylight or ghost reflections may appear in the image frames due to in-cabin straylight from an instrument panel surface and/or another vehicle surface being reflected by the windshield 108. Such image frames with reflections may be passed to the perception pipeline 110 in the vehicle and processed, as explained herein. For example, FIG. 3 depicts a user display 300 showing an image frame of scenery in front of the vehicle, where the image frame includes a reflection 304 along a left side of the frame.

Figure 3:
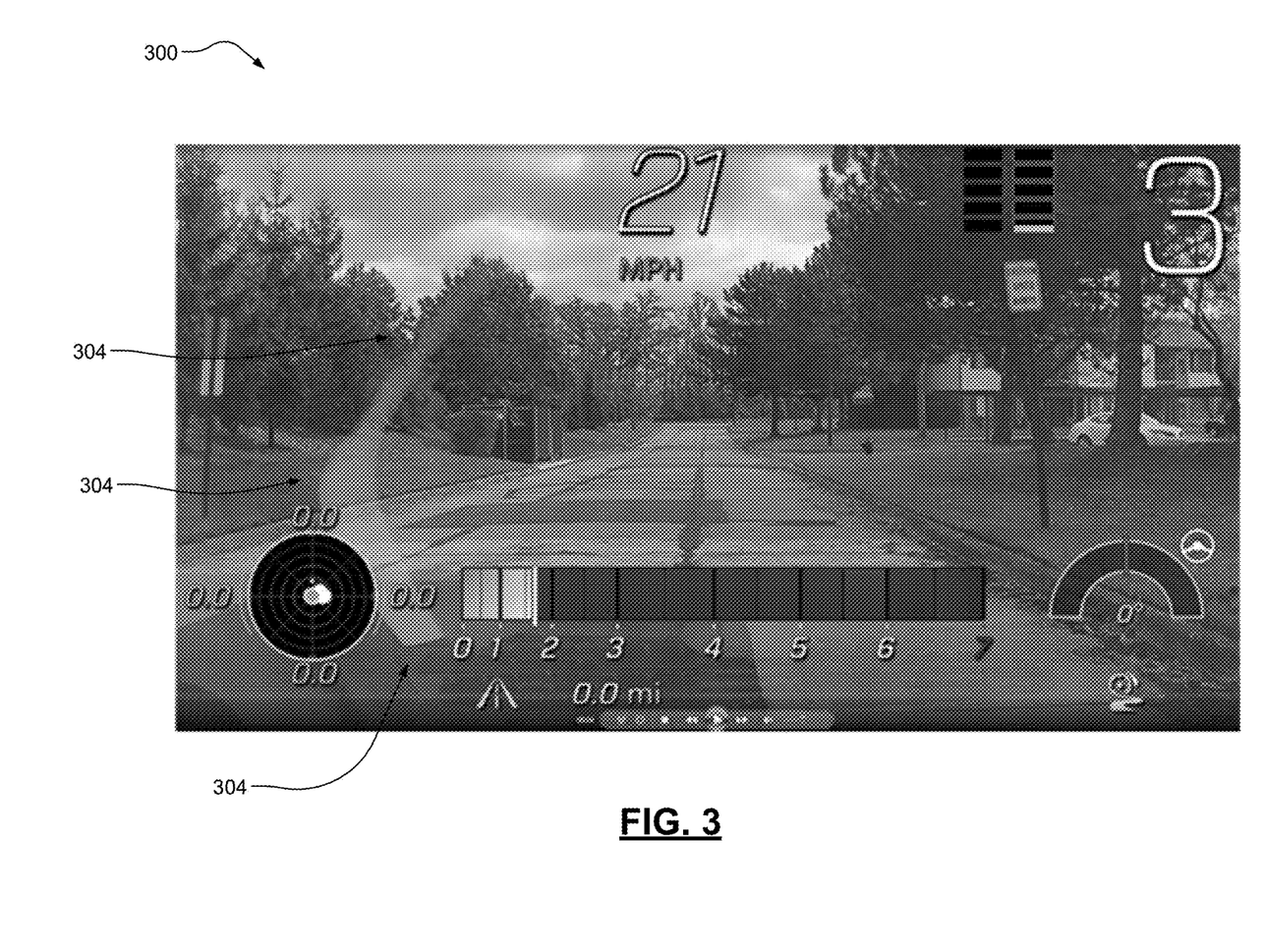
FIG. 3 is a display showing an image frame of scenery in front of the vehicle where the image frame includes a reflection, according to the present disclosure.

With continued reference to FIG. 1, the control module 102 may analyze the captured image frame to identify whether a reflection is present in the one or more image frames, such as the image frame of the FIG. 3. In some examples, the control module 102 may analyze pixels of the captured image frame(s) to make this determination. For example, when the vehicle is moving, the presence of static (e.g., nonmoving) pixels in the captured image frame(s) may indicate a reflection is present in the frame(s). As such, the control module 102 may scan the image frame for one or more static pixels to identify whether the reflection is present.

Additionally, in some examples, the control module 102 may further analyze the pixels to verify the static pixels uncovered in the scan are associated with the reflection. For example, the control module 102 may optionally perform a bit slice analysis of the captured image frame(s) to confirm the static pixels are in fact associated with the reflection. In such examples, the control module 102 may divide each captured image frame into big planes by, for example, converting pixel values in a binary form and dividing the binary form of the pixel values into bit planes, as is conventional. The control module 102 then may analyze the bit planes for the one or more image frames to verify whether the static pixels are associated with the reflection.

Then, the control module 102 may selectively activate the linear polarizer module 106 to remove the reflection from one or more subsequent image frames captured by the camera module 104. In such examples, the activation of the linear polarizer module 106 occurs in response to identifying the reflection in the captured image frame. For example, the linear polarizer module 106 may be switchable or otherwise controllable to turn on and off based on a control signal from the control module 102. When the reflection is identified, the control module 102 may transmit the control signal to switch on the linear polarizer module 106. In doing so, the linear polarizer module 106, which reduces a quality of captured image frames by the camera module 104, may be activated only when a particular condition occurs (e.g., when a reflection is identified).

In various embodiments, the control module 102 may modify parameters associated with the camera module 104 to obtain higher quality images when the linear polarizer module 106 is activated. For example, the control module 102 may obtain parameters of the received image frame with the reflection, such as a contrast value, a luma value, etc. Then, the control module 102 may modify a contrast value and a luma value of the camera module 104 based on the obtained contrast value and luma value to increase a quality of a subsequent image frame captured by the camera module 104 via the activated linear polarizer module 106. In such examples, the contrast value and the luma value (e.g., a luminance slope value) of the captured image frame may be obtained in conventional manners, such as from a look up table based on processing of the received image frame. The obtained contrast and the luma values may then be used (e.g., as is, modified for use with, etc.) for the camera module 104. In such examples, the contrast and the luma values for the camera module 104 may be stored in a look up table for future use.

In some embodiments, the control module 102 may selectively activate the linear polarizer module 106 to identify a reflection. Once identified, the control module 102 may remove the reflection from a higher qualify image frame from when the linear polarizer module 106 is deactivated. For example, the control module 102 may receive one or more image frames from the camera module 104 when the linear polarizer module 106 is deactivated, and receive one or more image frames from the camera module 104 when the linear polarizer module 106 is activated. In such examples, the image frame(s) from the camera module 104 when the linear polarizer module 106 is deactivated are of a higher quality than the image frame(s) from the camera module 104 when the linear polarizer module 106 is activated. In various embodiments, the control module 102 may receive the different image frames (when the linear polarizer module 106 is activated and not) at substantially the same time (e.g., consecutively captured image frames). Additionally, the control module 102 may receive the image frame(s) when the linear polarizer module 106 is activated before or after receiving the image frame(s) when the linear polarizer module 106 is deactivated.

Then, the control module 102 analyzes the image frames from when the linear polarizer module 106 is activated and not to identify whether a reflection is present. For example, the control module 102 may compare the different image frames to determine whether a reflection is present the image frame captured when the linear polarizer module 106 is off. More specifically, the control module 102 may process and compare corresponding pixels of the different image frames and identify the presence of a reflection based on the pixels.

Next, if a reflection is identified, the control module 102 removes the reflection from the higher quality image frame(s) captured when the linear polarizer module 106 is off. For example, the control module 102 may remove the reflection from the image frame by modifying pixels in that image frame. In such examples, the control module 102 may replace the pixels of the image frame captured when the linear polarizer module 106 is off with corresponding pixels of the image frame captured when the linear polarizer module 106 is on (e.g., with the reflection is filtered out). In other examples, the control module 102 may modify the pixels in another suitable manner to remove the reflection from the image frame.

In various embodiments, the control module 102 may deactivate the linear polarizer module 106 when certain conditions apply. This may be desirable because the linear polarizer module 106 reduces a quality of image frames captured by the camera module 104 and transmitted to the perception pipeline 110 in the vehicle for use in controlling various driver assistance applications, such as autonomy applications. In some examples, the conditions for deactivating the linear polarizer module 106 may be based on a number of captured image frames, a defined period of time, etc. For example, the control module 102 may deactivate the linear polarizer module 106 in response to a defined number of consecutive image frames captured by the camera module 104 after activating the linear polarizer module 106. In such examples, the defined number of consecutive image frames may be any suitable number, such as thirty consecutive image frames, forty consecutive image frames, sixty consecutive image frames, seventy consecutive image frames, eighty consecutive image frames, etc.

In some embodiments, the windshield 108 may include a coating on one or more surfaces thereof. In such examples, the coating may provide various functions related to the capturing of image frames. For example, the coating may have an anti-reflection function to reduce a loss of intensity of the image frames due to the reflection on the windshield 108. Additionally, the coating may have a polarization filtering function. In such examples, the coating may reduce the overall straylight intensity due to the polarization dependent reflectivity of the windshield 108 in the setup of the windshield 108. In some examples, the reduction of straylight intensity can increase the image contrast. Further, in some examples, the coating may have a self-cleaning function. For example, the coating may have a photocatalytic effect and provide self-cleaning when applied to an outer surface of the windshield 108. Moreover, the coating may have a hydrophilicity function. In such examples, the windshield 108 may have hydrophilicity with a hydrophilic coating on the outer surface, which can prevent rain droplets becoming ball lenses on the windshield 108. In some examples, the ball lens may affect the captured image frame and lead to the reduction of field of view of the camera module 104.

Figure 2:
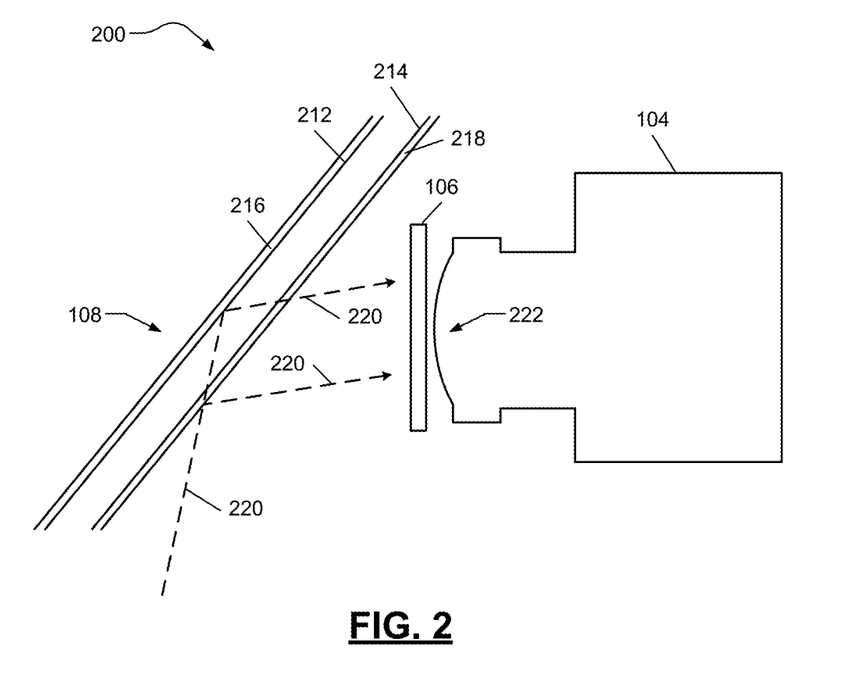
FIG. 2 is a block diagram of another example system for removing reflections from image frames captured by a camera module located within a vehicle, according to the present disclosure.

For example, FIG. 2 depicts an example system 200 employing a windshield coating employable in the system 100 of FIG. 1. The system 200 of FIG. 2 generally includes the camera module 104, the linear polarizer module 106, and the windshield 108 of FIG. 1, with the windshield 108 positioned adjacent to the camera module 104. As shown, the windshield 108 includes opposing surfaces 212, 214 and coatings 216, 218 applied to the surfaces 212, 214, respectively. In such examples, the coatings 216, 218 may the same type of coating or different.

In the example of FIG. 2, reflections from an instrument panel surface and/or another vehicle surface are reflected by both surfaces 212, 214 of the windshield 108, as shown by dashed lines 220. In such examples, the coatings 216, 218 may reduce a loss of intensity of the image frames captured by the camera module 104 via a lens 222 due to the reflections, and/or function to achieve any one of the other results described above.

While the windshield 108 and the coatings 216, 218 are shown in a particular configuration in FIG. 2, it should be appreciated that other configurations may be employed if desired. For example, only one surface (e.g., the surface 212 or the surface 214) may include a coating applied thereon. In other examples, the windshield 108 may include two separate windshield portions with a gap (e.g., an air gap) therebetween. In such examples, each windshield portion includes two surfaces (e.g., similar to the surfaces 212, 214). If desired, a coating may be applied to each surface or some of the surfaces of the windshield portions.

Figure 4:
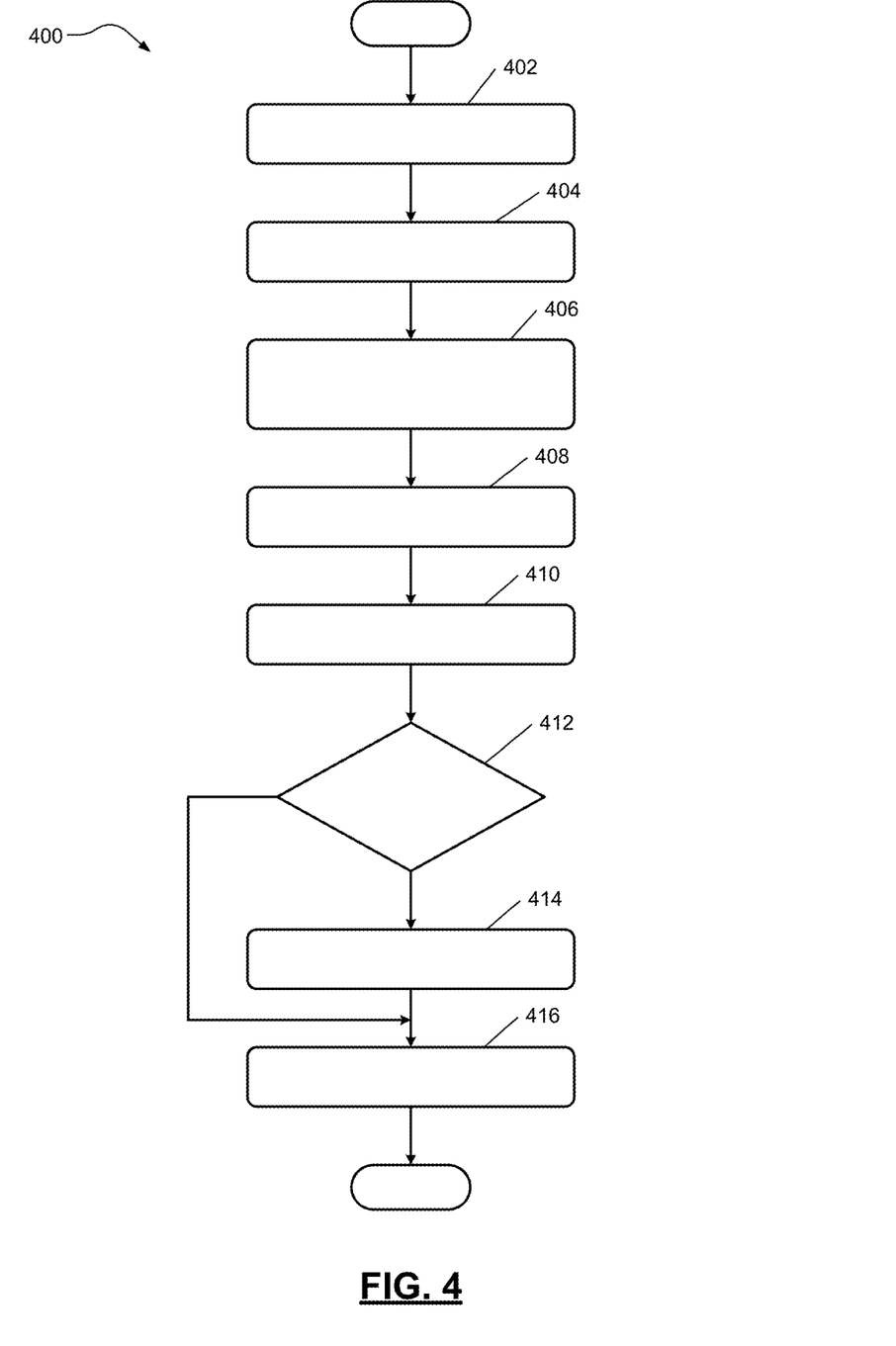
FIGS. 4-6 are flowcharts of example control processes for removing reflections from image frames captured by a camera module located within a vehicle, according to the present disclosure.
Figure 5:
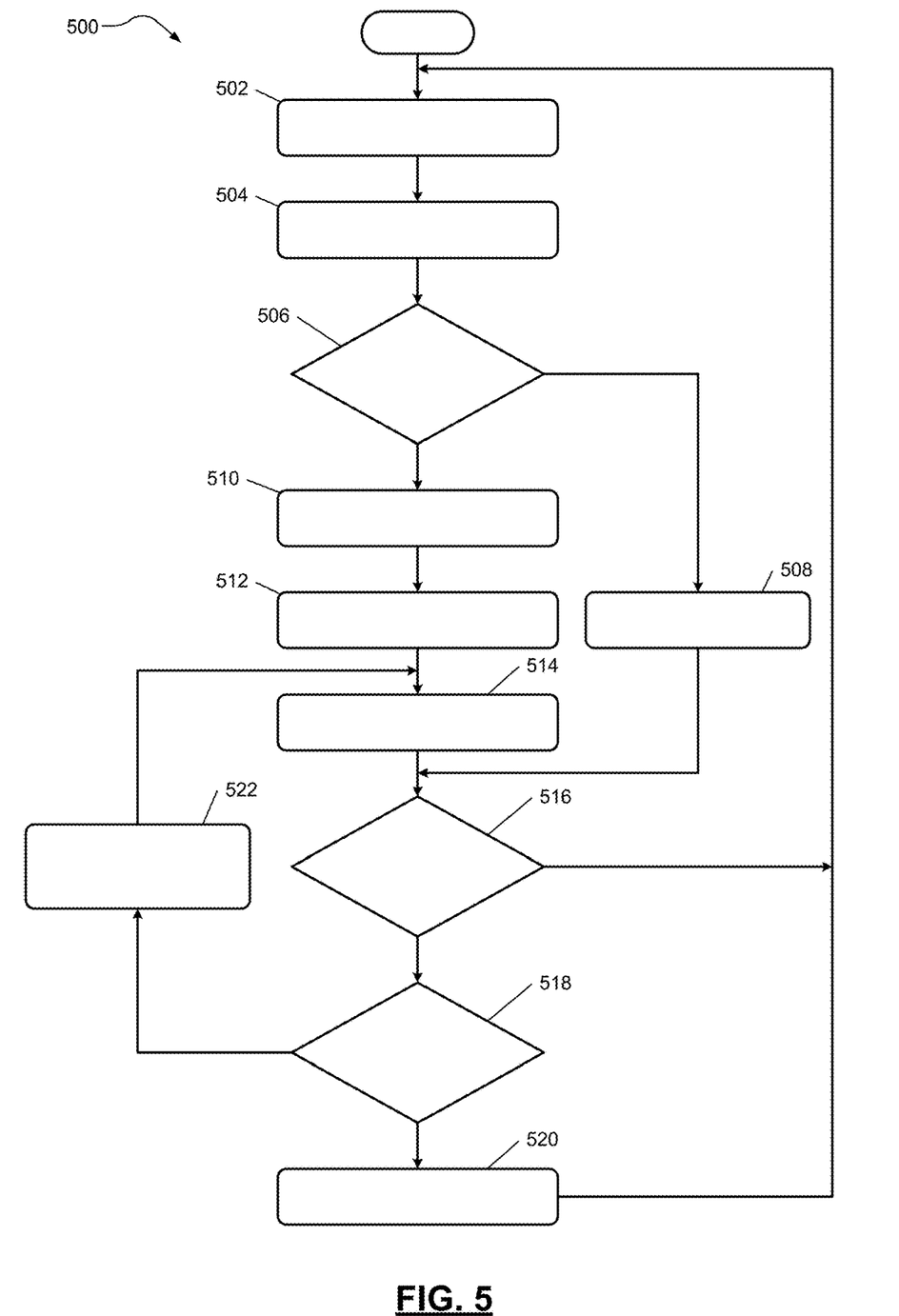
Figure 6:
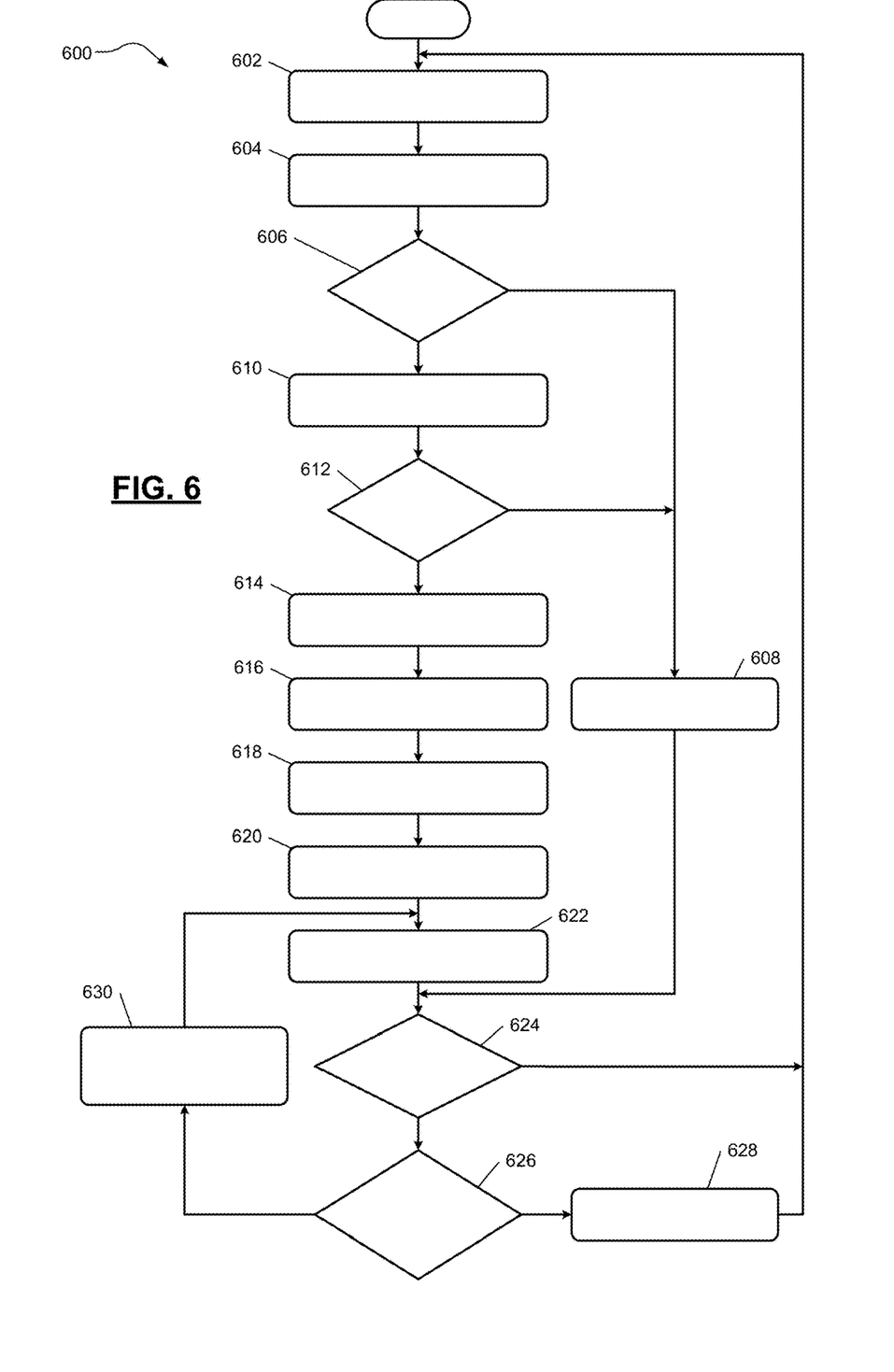

FIGS. 4-6 illustrate example control processes 400, 500, 600 employable by the control module 102 of FIG. 1 for removing reflections from image frames captured within a vehicle. Although the example control processes 400, 500, 600 are described in relation to the system 100 of FIG. 1 including the control module 102, any one of the control processes 400, 500, 600 may be employable by any suitable system.

As shown in FIG. 4, control begins at 402 where the control module 102 receives one or more image frames from a camera module, such as the camera module 104 of FIG. 1. In such examples, the image frame(s) may depict scenery generally in front of the vehicle as explained herein. Control then proceeds to 404, 406, 408.

At 404, the control module 102 activates a linear polarizer module, such as the linear polarizer module 106 of FIG. 1. Then once the linear polarizer module is activated, the control module 102 receives one or more additional image frames from the camera module via the activated linear polarizer module at 406, as explained herein. Once the additional image frame(s) are received, the control module 102 may deactivate the linear polarizer module at 408. For example, in various embodiments, the control module 102 may deactivate the linear polarizer module in response to a defined number (e.g., 20, 30, 40, 50, 60, 70, etc.) of consecutive image frames captured by the camera module after activating the linear polarizer module, in response to a define period of time after activating the linear polarizer module, etc. In other examples, control may activate the linear polarizer module, receive image frame(s) from the camera module via the activated linear polarizer module, and deactivate the linear polarizer module before receiving the image frame(s) from the camera module if desired. Regardless, control then proceeds to 410.

At 410, the control module 102 compares the image frames from when the linear polarizer module was activated and not activated. In doing so, the control module 102 may identify whether a reflection is present in the received image frame(s) from when the linear polarizer module was activated, as explained above. In some examples, this determination may be made based on the comparison of pixels in the different image frames as explained above. Control then proceeds to 412.

At 412, the control module 102 determines whether a reflection is present in the received image frame(s) from when the linear polarizer module was not activated. If yes, control proceeds to 414. If no, control proceeds to 416.

At 414, the control module 102 modifies the image frame(s) from when the linear polarizer module was not activated to remove the identified reflection. In some examples, the control module 102 may modify pixels in the image frame(s) to remove the reflection as explained above. Control then proceeds to 416.

At 416, the control module 102 transmits the image frame(s) to a perception pipeline in the vehicle for use in controlling various driver assistance applications, such as autonomy applications. In some examples, the transmitted image frame(s) may be image frames modified to remove a reflection or unmodified image frames. Control may then end as shown in FIG. 4 or may return to another suitable step, such as 402, if desired.

With reference to FIG. 5, control begins at 502 where the control module 102 receives one or more image frames from a camera module, such as the camera module 104 of FIG. 1. The image frame(s) may depict scenery generally in front of the vehicle as explained herein. Control then proceeds to 504.

At 504, the control module 102 analyzes the received image frames to identify a reflection. For example, the control module 102 may scan for static pixels in the captured image frame(s) and/or perform a bit slice analysis of the captured image frame(s) to determine whether a reflection is present, as explained above. Control then proceeds to 506.

At 506, the control module 102 determines whether a reflection is identified in the received image frame(s). If no, control proceeds to 508 where the control module 102 transmits the received image frame(s) to a perception pipeline in the vehicle for use in controlling various driver assistance applications, as explained above. Control then proceeds to 516. If, however, a reflection is present in the received image frame(s) at 506, control proceeds to 510.

At 510, the control module 102 activates a linear polarizer module, such as the linear polarizer module 106 of FIG. 1. For example, the control module 102 may generate and transmit a control signal to the linear polarizer module, thereby activating (e.g., switching on, turning on, etc.) the linear polarizer module as explained above. Control then proceeds to 512 and 514, where the control module 102 receives one or more image frames from the camera module via the activated linear polarizer module and transmits the received image frame(s) to the perception pipeline in the vehicle for use in controlling various driver assistance applications, as explained above. Control proceeds to 516.

At 516, the control module 102 determines whether the linear polarizer module is activated. In various embodiments, the control module 102 may set a value stored therein when the transmits the control signal to activate the linear polarizer module, and/or receive a signal from the linear polarizer module when the linear polarizer module is activated. If no, control may return to 502 as shown in FIG. 5 or another suitable step if desired or end. If, however, the control module 102 determines that the linear polarizer module is activated at 516, control proceeds to 518.

At 518, the control module 102 determines whether a condition is met to deactivate the linear polarizer module. For example, the control module 102 may determine whether a defined number of consecutive image frames are captured by the camera module after activating the linear polarizer module at 510, as explained herein. In other examples, the control module 102 may determine that a defined period of time has passed after activating the linear polarizer module at 510. If the condition is met at 518, control proceeds to 520 where the control module 102 deactivates the linear polarizer module (e.g., by transmitting another control signal to the linear polarizer module, etc.). Control may return to 502 as shown in FIG. 5 or another suitable step if desired or end.

If, however, the condition is not met at 518, control proceeds to 522 where the control module 102 receives another image frame from the camera module via the activated linear polarizer module, as explained above. Control then returns to 514 as shown in FIG. 5.

With reference to FIG. 6, control begins at 602 where the control module 102 receives one or more image frames from a camera module, such as the camera module 104 of FIG. 1, as explained above relative to 502 of FIG. 5. Control then proceeds to 604.

At 604, the control module 102 performs imaging processing on the received image frame(s). For example, the control module 102 may scan the received image frame(s) for one or more static pixels as explained above. Control then proceeds to 606, where the control module 102 determines whether any static pixels are present in the image frame(s). If no, control proceeds to 608 where the control module 102 transmits the received image frame(s) to a perception pipeline in the vehicle for use in controlling various driver assistance applications, as explained above. Control then proceeds to 624.

If, however, the control module 102 determines that a static pixel is present at 606, control proceeds to 610. At 610, the control module 102 performs a bit slice analysis of the captured image frame(s), as explained above. In such examples, the bit slice analysis and the static pixel scan are employed to identify and verify the presence of a reflection in the captured image frame(s). Control then proceeds to 612.

At 612, the control module 102 determines whether a reflection is identified in the captured image frame(s) based on, for example, the bit slice analysis and the static pixel scan. If no, control proceeds to 608, as explained above. If, however, the control module 102 determines that a reflection is present, control proceeds to 614.

At 614, the control module 102 obtains a contrast value and a luma value (e.g., a luminance slope value) of the captured image frame(s), as explained above. For example, the contrast value and the luma value of the captured image frame(s) may be obtained in conventional manners, such as from a look up table based on processing of the received image frame. Control then proceeds to 616.

At 616, the control module 102 activates a linear polarizer module, such as the linear polarizer module 106 of FIG. 1. For example, the control module 102 may generate and transmit a control signal to the linear polarizer module, as explained above. Control then proceeds to 618.

At 618, the control module 102 modifies a contrast value and a luma value of the camera module to increase a quality of a subsequent image frame captured by the camera module via the activated linear polarizer module, as explained above. For examples, the contrast value and the luma value of the camera module may be modified based on the obtained contrast value and luma value at 614. Control then proceeds to 620 and 622, where the control module 102 receives one or more image frames from the camera module via the activated linear polarizer module and transmits the received image frame(s) to the perception pipeline in the vehicle, as explained above. Control proceeds to 624.

At 624, the control module 102 determines whether the linear polarizer module is activated, as explained above. If not, control may return to 602 as shown in FIG. 6 or another suitable step if desired or end. If, however, the linear polarizer module is activated, control proceeds to 626 where the control module 102 determines whether a condition is met to deactivate the linear polarizer module, as explained above. If the deactivation condition is met, control proceeds to 628 where the control module 102 deactivates the linear polarizer module as explained above. Control then may return to 602 as shown in FIG. 6 or another suitable step if desired or end. If, however, the deactivation condition is not met at 626, control proceeds to 630 where the control module 102 receives another image frame from the camera module via the activated linear polarizer module, as explained above. Control then returns to 622 as shown in FIG. 6.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for a vehicle, the system comprising:
    a camera module located within a vehicle, the camera module configured to acquire image frames depicting scenery external to the vehicle as the vehicle moves, and transmit the image frames to a perception pipeline of the vehicle;
a linear polarizer module positioned in a field of view of the camera module; and
a control module in communication with the camera module and the linear polarizer module, the control module configured to:
receive image frames from the camera module;
analyze the image frames to identify whether a reflection is present; and
in response to identifying the reflection in the image frames, selectively activate the linear polarizer module to remove the reflection from a subsequent image frame captured by the camera module.

2. The system of claim 1, wherein the control module is configured to scan the image frames for one or more static pixels in each of the image frames to identify whether the reflection is present.

3. The system of claim 2, wherein the control module is configured to verify the one or more static pixels are associated with the reflection based on a bit slice analysis of the image frames.

4. The system of claim 2, wherein the control module is configured to modify a contrast value and a luma value of the camera module to increase a quality of the subsequent image frame captured by the camera module via the activated linear polarizer module.

5. The system of claim 4, wherein the control module is configured to:
obtain a contrast value and a luma value of at least one of the received image frames with the reflection; and
modify the contrast value and the luma value of the camera module based on the contrast value and the luma value of the at least one of the received image frames.

6. The system of claim 1, wherein the control module is configured to deactivate the linear polarizer module.

7. The system of claim 6, wherein the control module is configured to deactivate the linear polarizer module in response to a defined number of consecutive image frames captured by the camera module after activating the linear polarizer module.

8. The system of claim 7, wherein the defined number of consecutive image frames is sixty consecutive image frames.

9. The system of claim 1, further comprising a windshield positioned adjacent to the camera module, the windshield including a surface and a coating applied to the surface, wherein:
the camera module is configured to acquire the image frames depicting scenery external to the vehicle via the windshield; and
the coating is configured to reduce a loss of intensity of the image frames due to the reflection.

10. A method of removing reflections from image frames captured by a camera module located within a vehicle; the method comprising:
receiving image frames from the camera module as the vehicle moves;
analyzing the image frames to identify whether a reflection is present;
in response to identifying the reflection in the image frames, selectively activating a linear polarizer module positioned in a field of view of the camera module to remove the reflection from a subsequent image frame captured by the camera module; and
transmitting the subsequent image frame to a perception pipeline of the vehicle for use in control of the vehicle.

11. The method of claim 10, wherein analyzing the image frames includes scanning the image frames for one or more static pixels in each of the image frames to identify whether the reflection is present.

12. The method of claim 11, wherein analyzing the image frame includes verifying the one or more static pixels are associated with the reflection based on a bit slice analysis of the image frames.

13. The method of claim 10, further comprising modifying a contrast value and a luma value of the camera module to increase a quality of the subsequent image frame captured by the camera module via the activated linear polarizer module.

14. The method of claim 13, further comprising obtaining a contrast value and a luma value of at least one of the image frames with the reflection, wherein modifying the contrast value and the luma value of the camera module includes modifying the contrast value and the luma value of the camera module based on the obtained contrast value and luma value.

15. The method of claim 10, further comprising deactivating the linear polarizer module.

16. The method of claim 15, wherein deactivating the linear polarizer module includes deactivating the linear polarizer module in response to a defined number of consecutive image frames captured by the camera module after activating the linear polarizer module.

17. The method of claim 16, wherein the defined number of consecutive image frames is sixty consecutive image frames.

18. A system for a vehicle, the system comprising:
a camera module located within a vehicle, the camera module configured to acquire image frames depicting scenery external to the vehicle as the vehicle moves, and transmit the image frames to a perception pipeline of the vehicle;
a linear polarizer module positioned in a field of view of the camera module; and
a control module in communication with the camera module and the linear polarizer module, the control module configured to:
receive a first image frame from the camera module;
selectively activate the linear polarizer module and receive a second image frame from the camera module;
compare the first image frame and the second image frame to identify whether a reflection is present in the first image frame; and
in response to identifying the reflection, remove the reflection from the first image frame.

19. The system of claim 18, wherein the control module is configured to remove the reflection from the first image frame by modifying pixels in the first image frame.

20. The system of claim 18, further comprising a windshield positioned adjacent to the camera module, the windshield including a surface and a coating applied to the surface, wherein:
the camera module is configured to acquire the image frames depicting scenery external to the vehicle via the windshield; and
the coating is configured to reduce a loss of intensity of the image frames due to the reflection.

* * * * *